Aug. 21, 1934.     F. M. BALDWIN     1,971,170
NUT CRACKING MACHINE
Filed May 25, 1932     2 Sheets-Sheet 1

INVENTOR.
Frederick M. Baldwin
BY Joseph B. Gardner
ATTORNEY

Aug. 21, 1934.                F. M. BALDWIN                1,971,170
                           NUT CRACKING MACHINE
                           Filed May 25, 1932              2 Sheets-Sheet 2
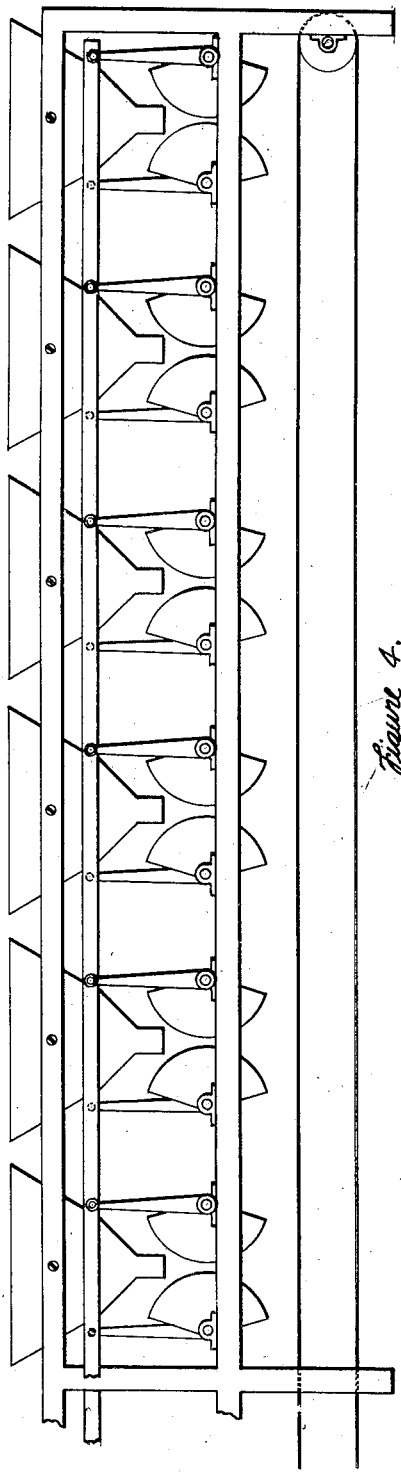
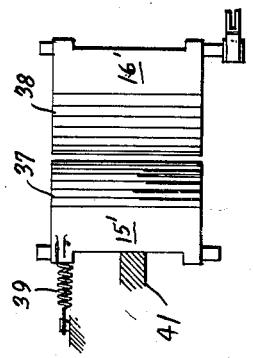
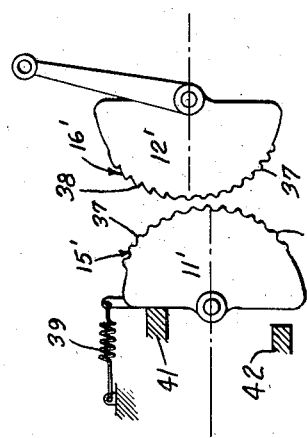
INVENTOR.
Frederick M. Baldwin
BY Joseph B. Gardner
                ATTORNEY Patented Aug. 21, 1934

UNITED STATES PATENT OFFICE 1,971,170

NUT CRACKING MACHINE

Frederick M. Baldwin, Oakland, Calif., assignor of one-half to Karl B. Fisher, Oakland, Calif.

Application May 25, 1932, Serial No. 613,471

5 Claims. (Cl. 146—11)

The invention relates to machines for cracking the outer shells of nuts preparatory to the removal of the kernel or meats from the nuts.

In general, nut cracking machines heretofore used, while capable of a comparatively large output, afford but a very low percentage of whole or unbroken nut meats. This has been caused in many instances by the incorporation of a feeding means with the machine which, while designed to afford an increased output of cracked nuts, served to so forcibly advance the nuts through the machine that an unduly large proportion of the kernels were ground with the shells. With such machines, a yield of from 20 to 30 percent of unbroken kernels was considered a high average. In addition these machines when set up to crack nuts of a certain size, were not capable of adjustment to satisfactorily crack nuts of a substantially different size. In the event a quantity of relatively small nuts were run through the machine, incomplete cracking would result, whereas an attempt to crack larger nuts result in a decided reduction in the already low percentage of whole meats obtained. In accordance with my invention, however, I have so changed the construction and mode of operation of my machine from those aforementioned as to not only provide an increased output for the size of the unit employed, but also to greatly increase the percentage of whole meats of the output, the gain being ordinarily about three times over that heretofore obtained. In addition I have provided a machine that may be easily and readily adjusted to operate on runs of different sized nuts with substantially equal efficiency.

Another feature of the invention is that the machine is simple, inexpensive and sturdy in construction, and has all the parts thereof readily accessible for complete inspection and repair without requiring dismantling any of the operating structure.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 4 is a side elevation of a battery of the units as shown in Figure 1, all mounted for simultaneous operation.

Figure 5 is a fragmentary side elevation of a modified form of my invention.

Figure 6 is a plan view of the unit shown in Figure 5.

Figure 1:
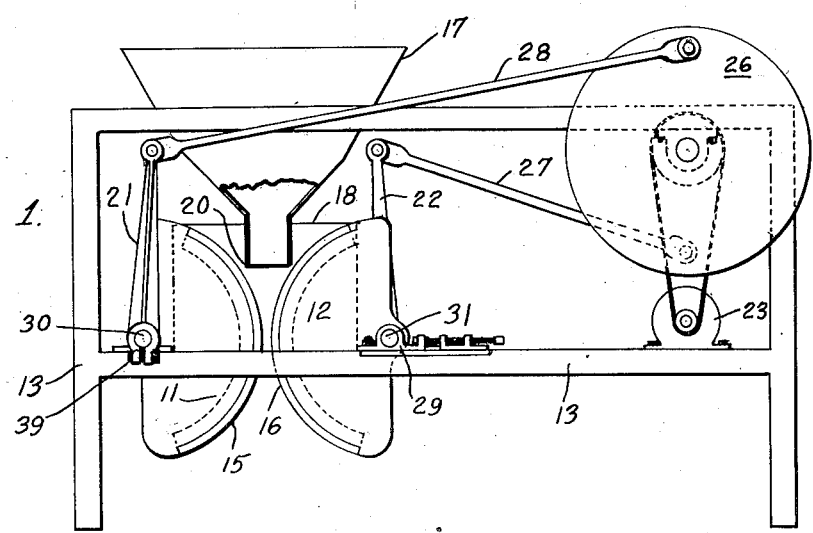
Figure 1 is a side elevation of a machine constructed in accordance with my invention.

As illustrated in the drawings, the machine of my invention comprises a pair of semi-cylindrical members 11 and 12 rotatably mounted at their centers of curvature along parallel spaced axes on a frame 13 and with their outer curved faces 15 and 16 opposed, slightly spaced, and divergently extending from each other. Nuts are fed onto the upper portions of faces 15 and 16 from a hopper 17 and are confined against transverse escapement from the faces by a pair of guards 18 and 19, which are secured to the frame and positioned across the opposite side edges of members 11 and 12. Secured to and projecting upwardly from the members are a pair of arms 21 and 22 employed to connect the members with a source of driving energy. While any source of power may of course be used, I have here shown, for the sake of illustration, an electric motor 23 connected by a belt to a pair of driving wheels 25 and 26, which latter are in turn connected to the arms 21 and 22 by a pair of links 27 and 28. Preferably and as here shown the connecting points of the links with the wheels are disposed 180 degrees from each other along the periphery of the wheels to thereby cause the members to be oscillated invariably in reverse directions.

The oscillatory movement imparted to the members 11 and 12 by the driving mechanism forms an important feature of my invention. In the development of the nut cracking machine, use had been made of a pair of full cylindrical drums of substantially the same diameter and mounted for rotation about their axes which were set parallel and spaced to afford a small clearance between the opposed, divergently extending, exterior surfaces of the drums. Nuts were fed onto the upper substantially V shaped space defined by the opposed outer surfaces on the drums, and the latter rotated in opposite directions so as to draw the nuts down into the space aforesaid and crushed between convergently moving parts of the drums. Due to the slow feeding of nuts through such machine, but a relatively small output of cracked nuts was obtained. In attempting to accelerate the feeding action, the outer surface of the drums was provided with projections which, however, entailed an irresistible progression and forced feeding of the nuts between the drums. This latter action, while serving to increase the machine's output, at the same time correspondingly decreased the quality of the output, since the nuts caught between opposed projections on the drum were practically ground into pulp, and the machine yielded such a small percentage of whole meats as to make its use uneconomical. In accordance with my invention, however, I provide a pair of semi-cylindrical members such as afore-described, and instead of continuously rotating these members they are given only a simple oscillatory movement. This motion serves to retain the nuts in a continued state of agitation until they jostle into a position wherein they may be cracked without injury to the meats. Once cracked, the nut portions pass through the space between the drums and drop onto a suitable receiving or conveying device (not shown), separation of the meats from the shells being effected such as by means of a blower or other device as is well known in the art.

As a further aid in the proper feeding and cracking of the nuts, the lower end 20 of the hopper 17 is positioned in close proximity to the faces 15 and 16 so that it will, in conjunction with the weight of the nuts in the hopper, serve first to check the undue raising of the nuts incident to the upward movement of the faces, and second, insure upon the succeeding downward movement of the members the advancement of the nuts into the restricted space between the faces 15 and 16 for cracking as aforesaid. While in the present embodiment the lower end of the hopper is thus utilized to check the upward movement of the nuts during oscillation of the members 11 and 12, it will be clear that some other type of checking means, when suitably positioned, may serve as well. Furthermore, should it be desirable to depend mainly or solely on the weight of the nuts to provide the increased feeding force, the throat of the hopper may be considerably increased.

In order to adapt the machine to different sized nuts, one of the members 11 or 12 is mounted for transverse adjustment to or from the other member to thereby vary the intervening space between the faces 15 and 16. This adjustment is here effected by mounting in a pair of bearings 29 which are slidably held on the frame 13, either of shafts 30 or 31 on which the respective members are arranged to oscillate.

Figure 2:
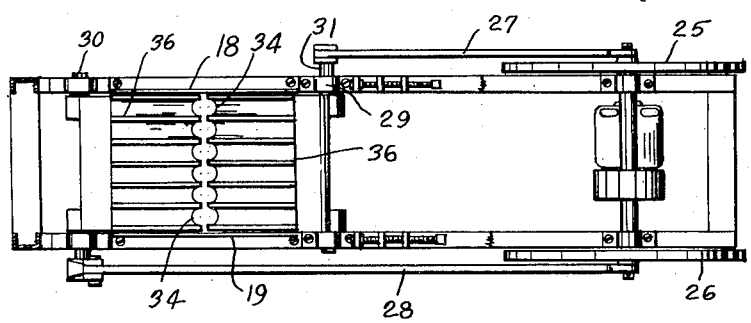
Figure 2 is a plan view of the machine as shown in Figure 1 with the hopper removed and part of the frame broken away to better show the construction.
Figure 3:
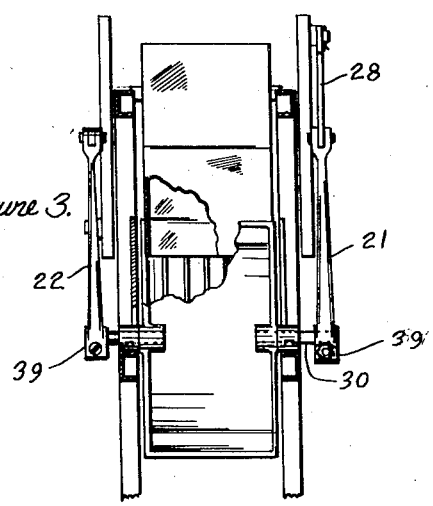
Figure 3 is an end elevation of the machine with a portion thereof broken away and shown in section.

The surface formation of the outer faces 15 and 16 of the members 11 and 12 also is an important feature of my invention. Two different formations of such surfaces are here illustrated, one as shown in Figures 1 and 2 being particularly adapted for cracking walnuts, while the other, shown in Figures 5 and 6, is designed principally for use with almonds. The first mentioned surface is in the form of a plurality of circumferentially extending semi-circular grooves 34 which are defined between or separated by narrow circumferential rib portions 36, the grooves and ribs of the one member being diametrically aligned with the grooves and ribs of the opposed member.

Upon oscillation of the members, the nuts confined between the lower end of the hopper and the surfaces aforesaid are set in a state of agitation and tend to gravitate towards the constricted portion between the members. In the present embodiment the space formed by the opposed grooved portions is slightly less than the size of the nuts to be shelled, and thus at the start of operations whole or uncracked nuts will be lodged in the grooves at the constricted portion while upon these nuts and up to the mouth of the hopper will be piled and supported the balance of the nuts. On the initial downward movement of the members, the nuts disposed in the opposed grooves will be uniformly compressed around the entire circumference of the nut due to the circular conformation of the cross section of the grooves to the nuts. Since there is a substantial space existing between the meat and the shell of a walnut, this compression action serves to thoroughly crush the outer shell uniformly inwardly into this space without in any way damaging the meats. Incident to the circumferential compression, and resultant crushing of the shell, will be the reduction in the space occupied by the nut, and in its reduced form the nut may readily escape through the passage defined by the opposed grooves.

Since no interengaging projections or equivalent means are used to obtain a forced feeding of nuts through the machine for the reasons above set forth, applicant relies for such feeding substantially entirely on the variable speed of the cracking surfaces provided by the oscillation aforesaid. As will be understood at the start of the downward movement of the cracking surfaces, the nuts positioned on the upper portions thereof are substantially at rest and accordingly by reason of their inertia resist being set in motion for drawing down between the surfaces for cracking. In accordance with my invention, however, the nut engaging surfaces move slowly at the start of the nut movement and then accelerate at a rate sufficiently low as to carry the nut along and between the surfaces for cracking. Another important feature afforded by the oscillation is in the preventing of the nuts from forming a self-supporting bridge across the upper portions of the cracking surfaces and thereby withholding nuts from passage to the constricted portion between the surfaces for cracking. Such bridges are avoided in my machine by reason of the variable forces on the nuts induced by the variable surface speed since as will be understood such a bridge formation may exist only under substantially constant conditions and in orienting itself to a change of incident force will collapse. Since the force transfer between the cracking surface and the nut for either accelerating the latter's speed or preventing the bridge formation above is by friction, the surface of the grooves and ribs are preferably roughened to afford an operating frictional resistance to the slipping of a nut thereover.

The surface of the members shown in Figures 5 and 6 is especially designed for use in cracking almonds. While this surface is shown on the outer faces 15' and 16' of a slightly modified arrangement of a pair of cylindrical members 11' and 12', it may nevertheless function to advantage when employed on the machine as shown in Figure 1. As shown in Figures 5 and 6, one of the faces 15' is provided with a plurality of longitudinally extending corrugations 37 which are arranged to cooperate with similar corrugations provided on the center and lower portions of the opposed face 16'. To insure the advancement of nuts through the machine a plurality of spaced longitudinally extending toothed-projections 38 are substituted for the smoother corrugations over the upper portion of the face 16'. As will be noted, the projections are omitted from the end portions of face 16' in order to allow for the ready passage of nut meats between the members upon movement of these ends into opposed relation to the center portion of face 15'. Power is supplied only to the member 12' while member 11' is resiliently held against displacement by means of a spring 39 and its movement confined by a pair of stops 41 and 42. I have also found that with this arrangement an improved feeding of nuts through the machine may be obtained by raising the pivotal point of member 12' above the pivotal point of member 11'.

In both of the embodiments of the invention illustrated it has been found that an oscillation of about 90 degrees is ample to insure proper feeding of the nuts through the machine. As the members 11 and 12 are substantially semi-circular with their outer faces 15 and 16 extending over approximately 180 degrees, it will be clear that during the operation of the machine only about half of the surface provided by the faces 15 and 16 are subject to use. In order, however, that the wearing of these faces may be distributed evenly thereover, means are preferably provided to shift the portions of the faces 15 and 16 which move in opposed relation to each other. Such a means is here shown in the form of an adjustable connection between the arms 21 and 22 with the shafts 30 and 31 provided at the centers of the members. With reference to Figure 1 it may be noted that the arms are each provided at their lower end with a releasable clamp 39 arranged for engagement with the shafts 30 and 31. By releasing the clamps 39 the angular relation between the arms 21 and 22 and the members 11 and 12 may be varied to thereby select the portion of the faces 15 and 16 which are to be set in opposed relation to each other.

As illustrated in Figure 4, I combine a plurality of units of the type shown in Figure 1 into a single machine with each unit simultaneously operating from a common power source and with the units adjusted to crack different sized nuts. Preferably the units are mounted in a horizontal row under a grader with the hoppers arranged to receive the nuts of the appropriate sizes. While adjustment of a unit to a particular size nut may be effected as aforementioned by varying the space between the cylindrical cracking members, it may also be effected by varying the size of the grooves 34 on the outer faces of these members, the size of the groove being cut proportionately in conformity to the size of the nuts to be cracked. Preferably in the arrangement shown in Figure 4 not only is the spacing between the members successively reduced in steps from one unit to another along the length of the set up, but the sizes of the grooves are also successively reduced with each unit to better accommodate the various sized nuts.

It will now be clear that the nut cracking machine of my invention is well adapted to the objects and features hereinbefore referred to.

I claim:

1. In a nut shelling machine, a pair of opposed oscillated members having circumferential grooves and having convex peripheral surfaces defining a passageway for a plurality of nuts at a time and with a nut shell crushing area therebelow designed for accommodating a single nut in a pair of opposed grooves at a time, the rate of supply of the nuts to and the capacity of the crushing area being such that the nuts will pile up in said passage over said area during the crushing operation, and means for oscillating the members, said means providing for a variable speed of the said surfaces of said members with the speed at times such that engagement between the surfaces and nuts will bring about shifting of the nuts in the passage independent of the movement due to gravity, said peripheral surfaces being mounted to move simultaneously along curved lines above and at the crushing area.

2. In a nut shelling machine, a pair of opposed oscillated members having circumferential grooves and having convex peripheral surfaces defining a passageway for a plurality of nuts at a time and with a nut shell crushing area therebelow designed for accommodating a single nut in a pair of opposed grooves at a time, the rate of supply of the nuts to and the capacity of the crushing area being such that the nuts will pile up in said passage over said area during the crushing operation, and means for oscillating the members, said means providing for a variable speed of the said surfaces of said members with the speed at times such that engagement between the surfaces and nuts will bring about shifting of the nuts in the passage independent of the movement due to gravity, said oscillated members consisting of semi-circular disks, said peripheral surfaces being mounted to move simultaneously along curved lines above and at the crushing area.

3. In a nut shelling machine, a pair of opposed oscillated members having circumferential grooves and having convex peripheral surfaces defining a passageway for a plurality of nuts at a time and with a nut shell crushing area therebelow designed for accommodating a single nut in a pair of opposed grooves at a time, the rate of supply of the nuts to and the capacity of the crushing area being such that the nuts will pile up in said passage over said area during the crushing operation, and means for oscillating the members, said means providing for a variable speed of the said surfaces of said members with the speed at times such that engagement between the surfaces and nuts will bring about shifting of the nuts in the passage independent of the movement due to gravity, said oscillated members consisting of semi-circular disks and said means including rods for actuating said disks, said peripheral surfaces being mounted to move simultaneously along curved lines above and at the crushing area.

4. In a nut shelling machine, a pair of opposed oscillated members having circumferential grooves and having convex peripheral surfaces defining a passageway for a plurality of nuts at a time, a hopper located above and midway between said members for containing a supply of nuts and with a nut shell crushing area therebelow designed for accommodating a single nut in a pair of opposed grooves at a time, the rate of supply of the nuts to and the capacity of the crushing area being such that the nuts will pile up in said passage over said area during the crushing operation, and means for oscillating the members, said means providing for a variable speed of the said surfaces of said members with the speed at times such that engagement between the surfaces and nuts will bring about shifting of the nuts in the passage independent of the movement due to gravity, said peripheral surfaces being mounted to move simultaneously along curved lines above and at the crushing area.

5. In a nut shelling machine, a pair of opposed oscillated members having circumferential grooves and having convex peripheral surfaces defining a passageway for a plurality of nuts at a time and with a nut shell crushing area therebelow designed for accommodating a single nut in a pair of opposed grooves at a time, the rate of supply of the nuts to and the capacity of the crushing area being such that the nuts will pile up in said passage over said area during the crushing operation, and means for oscillating the members, said means including rotary driving means providing for a variable speed of the said surfaces of said members with the speed at times such that engagement between the surfaces and nuts will bring about shifting of the nuts in the passage independent of the movement due to gravity, said oscillated members consisting of semi-circular disks and said means including rods for actuating said disks, said rods having one of their ends connected to said nut cracking members and the other ends eccentrically connected to said rotary driving means, said peripheral surfaces being mounted to move simultaneously along curved lines above and at the crushing area.

FREDERICK M. BALDWIN.